(12) United States Patent
Peng et al.

(10) Patent No.: US 7,524,555 B2
(45) Date of Patent: **\*Apr. 28, 2009**

(54) PRE-FINISHED AND DURABLE BUILDING MATERIAL

(75) Inventors: Weiling Peng, Murietta, CA (US);
James A. Gleeson, Upland, CA (US);
Donald J. Merkley, Alta Loma, CA (US)

(73) Assignee: James Hardie International Finance B.V., Amsterdam (NL)

( * ) Notice: Subject to any disclaimer, the term of this patent is extended or adjusted under 35 U.S.C. 154(b) by 0 days.

This patent is subject to a terminal disclaimer.

(21) Appl. No.: 10/770,739

(22) Filed: Feb. 3, 2004

(65) Prior Publication Data

US 2004/0163331 A1    Aug. 26, 2004

Related U.S. Application Data

(63) Continuation of application No. 09/716,681, filed on Nov. 20, 2000, now Pat. No. 6,689,451.

(60) Provisional application No. 60/166,513, filed on Nov. 19, 1999.

(51) Int. Cl.
*B32B 13/00* (2006.01)
*B32B 27/04* (2006.01)
*B32B 3/26* (2006.01)
*B32B 27/08* (2006.01)

(52) U.S. Cl. .............. 428/294.7; 428/297.1; 428/301.4; 428/320.2; 428/322.2; 428/503; 428/530; 52/100

(58) Field of Classification Search .................. 52/100; 428/294.7, 297.1, 301.4, 320.2, 322.2, 503, 428/530
See application file for complete search history.

(56) References Cited

U.S. PATENT DOCUMENTS 369,216 A    8/1887    Temple (Continued)

FOREIGN PATENT DOCUMENTS

AU    515151    7/1980

(Continued)

OTHER PUBLICATIONS

Hawley's Condensed Chemical Dictionary, Fourteenth Edition, Revised by Richard J. Lewis, Sr., published by John Wiley & Sons, Inc. pp. 447, 624, 903-904.*

(Continued)

*Primary Examiner*—D. Lawrence Tarazano
*Assistant Examiner*—Camie S Thompson
(74) *Attorney, Agent, or Firm*—Gardere Wynne Sewell LLP (57) ABSTRACT

A pre-finished, moisture resistant and durable building material is provided. In one embodiment the building material includes a fiber cement substrate having a first side and a second side, at least one resin impregnated paper over at least one of the first and second sides, and a stress-relieving polymeric film between the fiber cement substrate and the at least one resin impregnated paper, the polymer film acting as a stress relaxer between the fiber cement substrate and the at least one resin impregnated paper. In another embodiment, a stress-relieving polymeric coating or film is provided between resin penetrated sheets and a substrate. In another embodiment, a process for bonding the resin penetrated sheets to the substrate is provided.

22 Claims, 1 Drawing Sheet

U.S. PATENT DOCUMENTS

| | | | |
|---|---|---|---|
| 494,763 A | 4/1893 | Smidth | |
| 525,442 A | 9/1894 | Burrows | |
| 575,074 A | 1/1897 | Smith | |
| 774,114 A | 11/1904 | Spear | |
| 815,801 A | 3/1906 | Depew et al. | |
| 1,399,023 A | 12/1921 | Murray | |
| 1,510,497 A | 10/1924 | Keller | |
| 1,630,801 A | 5/1927 | Parsons | 264/33 |
| 1,634,809 A | 7/1927 | Weiss | |
| 1,698,557 A | 1/1929 | O'Brien | 52/426 |
| 1,997,939 A | 10/1930 | Loucks | 52/506.08 |
| 1,856,932 A | 5/1932 | Shaw | |
| 1,856,936 A | 5/1932 | Turner | |
| 1,871,843 A | 8/1932 | Ericson | |
| 1,930,024 A | 10/1933 | Varden | |
| 1,943,663 A | 1/1934 | Ericson | |
| 1,959,519 A | 5/1934 | Black | |
| 1,976,984 A | 10/1934 | Condon et al. | |
| 1,978,519 A | 10/1934 | Willock et al. | |
| 1,995,393 A | 3/1935 | Manske | |
| 2,009,619 A | 7/1935 | Huffine | |
| 2,062,149 A | 11/1936 | Stark et al. | |
| 2,182,372 A | 12/1939 | Cox et al. | |
| 2,224,351 A | 12/1940 | Kaye | |
| 2,253,753 A | 8/1941 | Black | |
| 2,276,170 A | 3/1942 | Elmendorf | |
| 2,317,634 A | 4/1943 | Olsen et al. | |
| 2,323,230 A | 6/1943 | McAvoy | |
| 2,324,325 A | 7/1943 | Schuh | |
| 2,354,639 A | 7/1944 | Seymour | |
| 2,400,357 A | 5/1946 | Krajci | |
| 2,413,794 A | 7/1947 | Small | |
| 2,447,275 A | 8/1948 | Price | |
| 2,511,083 A | 6/1950 | Small | |
| 2,517,122 A | 8/1950 | Lockwood | |
| 2,624,298 A | 1/1953 | Farren | |
| 2,694,025 A | 11/1954 | Slayter et al. | |
| 2,724,872 A | 11/1955 | Herbes | |
| 2,782,463 A | 2/1957 | Bergvall et al. | 52/264 |
| 2,928,143 A | 3/1960 | Newton | |
| 3,046,700 A | 7/1962 | Davenport | |
| 3,047,985 A | 8/1962 | Murphy | |
| 3,173,229 A | 3/1965 | Weber | |
| 3,181,662 A | 5/1965 | Maertzig, Jr. | |
| 3,214,876 A | 11/1965 | Mattes | |
| 3,235,039 A | 2/1966 | O'Donnell | 52/235 |
| 3,236,932 A | 2/1966 | Grigas et al. | 52/543 |
| 3,284,980 A | 11/1966 | Dinkel | |
| 3,333,379 A | 8/1967 | Harris | 52/364 |
| 3,408,786 A | 11/1968 | Snyker | |
| 3,415,019 A | 12/1968 | Anderson | 52/94 |
| 3,416,275 A | 12/1968 | Van Longhem et al. | |
| 3,421,281 A | 1/1969 | Harris | 52/733.3 |
| 3,481,093 A | 12/1969 | Davidson | 52/293.1 |
| 3,527,004 A | 9/1970 | Sorenson | |
| 3,606,720 A | 9/1971 | Cookson | 52/714 |
| 3,625,808 A | 12/1971 | Martin | |
| 3,635,742 A | 1/1972 | Fujimasu | |
| 3,660,955 A | 5/1972 | Simon | |
| 3,663,341 A | 5/1972 | Veneziale, Jr. | 428/203 |
| 3,663,353 A | 5/1972 | Long et al. | 428/332 |
| 3,703,795 A | 11/1972 | Mattes | |
| 3,708,943 A | 1/1973 | Thomas et al. | 52/309.8 |
| 3,729,368 A | 4/1973 | Ingham et al. | |
| 3,754,365 A | 8/1973 | Carrick et al. | |
| 3,780,483 A | 12/1973 | Mattes | |
| 3,782,985 A | 1/1974 | Gebhardt | |
| 3,797,179 A | 3/1974 | Jackson | |
| 3,797,190 A | 3/1974 | Widdowson | |
| 3,804,058 A | 4/1974 | Messenger | |
| 3,818,668 A | 6/1974 | Charniga | |
| 3,835,604 A | 9/1974 | Hoffmann, Jr. | |
| 3,847,633 A | 11/1974 | Race | |
| 3,866,378 A | 2/1975 | Kessler | |
| 3,869,295 A | 3/1975 | Bowles et al. | 521/55 |
| 3,888,617 A | 6/1975 | Barnett | 425/296 |
| 3,902,911 A | 9/1975 | Messenger | |
| 3,921,346 A | 11/1975 | Sauer et al. | |
| 3,928,701 A | 12/1975 | Roehner | 428/222 |
| 3,974,024 A | 8/1976 | Yano et al. | |
| 3,986,312 A | 10/1976 | Calhoun et al. | 52/242 |
| 3,992,845 A | 11/1976 | Grzesiek | |
| 4,010,587 A | 3/1977 | Larsen | |
| 4,010,589 A | 3/1977 | Gross | |
| 4,015,392 A | 4/1977 | Eaton | |
| 4,028,859 A | 6/1977 | Bellagamba | 52/393 |
| 4,034,528 A | 7/1977 | Sanders et al. | |
| 4,047,355 A | 9/1977 | Knorr | |
| 4,052,829 A | 10/1977 | Chapman | 52/281 |
| 4,058,944 A | 11/1977 | Rieger | 52/235 |
| 4,063,393 A | 12/1977 | Toti | 52/245 |
| 4,065,899 A | 1/1978 | Kirkhuff | |
| 4,070,843 A | 1/1978 | Leggiere et al. | |
| 4,076,884 A | 2/1978 | Riley et al. | |
| 4,079,562 A | 3/1978 | Englert et al. | |
| 1,512,084 A | 5/1978 | Arthur et al. | |
| 4,101,335 A | 7/1978 | Barrable | |
| 4,102,106 A | 7/1978 | Golder et al. | |
| 4,104,103 A | 8/1978 | Tarullo | |
| 4,104,840 A | 8/1978 | Heintz et al. | |
| 4,110,507 A | 8/1978 | Colledge | |
| 4,112,647 A | 9/1978 | Scheid | |
| 4,118,236 A | 10/1978 | Erskine | |
| 4,128,696 A | 12/1978 | Goebel et al. | 428/425.1 |
| 4,132,555 A | 1/1979 | Barrable | |
| 4,150,517 A | 4/1979 | Warner, Sr. | 52/288.1 |
| 4,152,878 A | 5/1979 | Balinski | |
| 4,166,749 A | 9/1979 | Sterrett et al. | |
| 4,183,188 A | 1/1980 | Goldsby | |
| 4,187,658 A | 2/1980 | Reinwall, Jr. | |
| 4,203,788 A | 5/1980 | Clear | |
| 4,211,525 A | 7/1980 | Vetter | 425/362.1 |
| 4,222,785 A | 9/1980 | Henderson | |
| 4,231,573 A | 11/1980 | Kelly | 473/117 |
| 4,268,317 A | 5/1981 | Rayl | |
| 4,274,239 A | 6/1981 | Carroll | |
| 4,292,364 A | 9/1981 | Wesch et al. | |
| 4,298,647 A | 11/1981 | Cancio et al. | |
| 4,307,551 A | 12/1981 | Crandell | 52/235 |
| 4,321,780 A | 3/1982 | Hooper et al. | 52/461 |
| 4,327,528 A | 5/1982 | Fritz | |
| 4,337,290 A | 6/1982 | Kelly et al. | 428/201 |
| 4,339,489 A | 7/1982 | Barker et al. | |
| 4,343,127 A | 8/1982 | Greve et al. | |
| 4,361,616 A | 11/1982 | Bomers | |
| 4,362,566 A | 12/1982 | Hinterwaldner | |
| 4,366,657 A | 1/1983 | Hopman | 52/405.1 |
| 4,370,166 A | 1/1983 | Powers et al. | |
| 4,373,955 A | 2/1983 | Bouchard et al. | |
| 4,373,957 A | 2/1983 | Pedersen et al. | 106/711 |
| 4,377,977 A | 3/1983 | Wurster | |
| 4,379,553 A | 4/1983 | Kelly | 473/117 |
| 4,380,564 A | 4/1983 | Cancio et al. | |
| 4,392,336 A | 7/1983 | Ganssle | |
| 4,399,643 A | 8/1983 | Hafner | |
| 4,406,703 A | 9/1983 | Guthrie et al. | |
| 4,420,351 A | 12/1983 | Lussi et al. | 156/62.4 |
| 4,424,261 A | 1/1984 | Keeling et al. | 428/530 |
| 4,429,214 A | 1/1984 | Brindley | |
| 4,441,944 A | 4/1984 | Massey | |
| 4,442,219 A | 4/1984 | TenEyck et al. | |
| 4,462,730 A | 7/1984 | Knohl | 411/371.1 |
| 4,462,835 A | 7/1984 | Car | |
| 4,463,532 A | 8/1984 | Faw | |

| | | | | | | |
|---|---|---|---|---|---|---|
| 4,465,729 A | 8/1984 | Cancio et al. | | 5,167,710 A | 12/1992 | Leroux et al. |
| 4,501,830 A | 2/1985 | Miller et al. | | 5,177,305 A | 1/1993 | Pichat |
| 4,502,256 A | 3/1985 | Hahn et al. ............ 52/63 | | 5,198,052 A | 3/1993 | Ali |
| 4,506,486 A | 3/1985 | Culpepper, Jr. et al. | | 5,198,275 A | 3/1993 | Klein |
| 4,514,947 A | 5/1985 | Grail | | 5,210,989 A | 5/1993 | Jakel |
| 4,553,366 A | 11/1985 | Guerin | | 5,226,274 A | 7/1993 | Sommerstein |
| 4,559,894 A | 12/1985 | Thompson | | 5,229,437 A | 7/1993 | Knight |
| 4,586,304 A | 5/1986 | Flamand | | 5,234,754 A | 8/1993 | Bache |
| 4,588,443 A | 5/1986 | Bache | | D339,642 S | 9/1993 | Blazley ............... D25/119 |
| 4,592,185 A | 6/1986 | Lynch et al. | | 5,242,736 A | 9/1993 | Van Erden et al. ......... 428/137 |
| 4,626,398 A | 12/1986 | Vetter et al. ............. 264/566 | | 5,244,318 A | 9/1993 | Arai et al. |
| 4,637,860 A | 1/1987 | Harper | | 5,245,811 A | 9/1993 | Knorr |
| 4,640,715 A | 2/1987 | Kritzman | | 5,247,773 A | 9/1993 | Weir |
| 4,641,469 A | 2/1987 | Wood | | 5,252,526 A | 10/1993 | Whittemore |
| 4,642,137 A | 4/1987 | Kritzman | | 5,259,872 A | 11/1993 | Shinozaki et al. |
| 4,661,398 A | 4/1987 | Ellis ..................... 442/295 | | 5,268,226 A | 12/1993 | Sweeney |
| 4,670,079 A | 6/1987 | Thompson ............ 156/307.5 | | 5,282,317 A | 2/1994 | Carter et al. |
| 4,673,659 A | 6/1987 | Wood et al. | | 5,297,370 A | 3/1994 | Greenstreet et al. ....... 52/287.1 |
| 4,680,059 A | 7/1987 | Cook et al. | | 5,301,484 A | 4/1994 | Jansson |
| 4,685,263 A | 8/1987 | Ting ..................... 52/235 | | 5,305,568 A | 4/1994 | Beckerman ............. 52/309.4 |
| 4,698,942 A | 10/1987 | Swartz | | 5,305,577 A | 4/1994 | Richards et al. |
| 4,730,398 A | 3/1988 | Stanton | | 5,319,909 A | 6/1994 | Singletery |
| 4,737,191 A | 4/1988 | Meynardi | | 5,323,581 A | 6/1994 | Jakel |
| 4,748,771 A | 6/1988 | Lehnert et al. | | 5,330,573 A | 7/1994 | Nakano et al. |
| 4,779,313 A | 10/1988 | Gonas .................... 24/289 | | 5,334,242 A | 8/1994 | O'Toole |
| 4,780,141 A | 10/1988 | Double et al. | | 5,338,349 A | 8/1994 | Farrar |
| 4,789,604 A | 12/1988 | Van der Hoeven ......... 428/503 | | 5,349,802 A | 9/1994 | Kariniemi |
| 4,793,861 A | 12/1988 | Sohm | | 5,352,288 A | 10/1994 | Mallow |
| 4,803,105 A | 2/1989 | Kretow et al. | | 5,352,290 A | 10/1994 | Takeshita et al. |
| 4,808,229 A | 2/1989 | Arhelger | | 5,358,676 A | 10/1994 | Jennings et al. |
| 4,811,538 A | 3/1989 | Lehnert et al. | | 5,369,924 A | 12/1994 | Neudorf et al. ............... 52/235 |
| 4,827,621 A | 5/1989 | Borsuk | | 5,372,678 A | 12/1994 | Sagstetter et al. |
| 4,840,672 A | 6/1989 | Baes | | 5,378,279 A | 1/1995 | Conroy |
| 4,841,702 A | 6/1989 | Huettemann | | 5,391,245 A | 2/1995 | Turner |
| 4,842,649 A | 6/1989 | Heitzmann et al. | | 5,394,672 A | 3/1995 | Seem |
| 4,854,101 A | 8/1989 | Champagne | | 5,395,685 A | 3/1995 | Seth et al. |
| 4,858,402 A | 8/1989 | Putz | | 5,397,631 A | 3/1995 | Green et al. ............... 428/219 |
| 4,866,896 A | 9/1989 | Shreiner et al. ............... 52/235 | | 5,410,852 A | 5/1995 | Edgar et al. |
| 4,870,788 A | 10/1989 | Hassan | | 5,425,985 A | 6/1995 | Irvin ..................... 442/203 |
| 4,876,827 A | 10/1989 | Williams et al. ............... 52/12 | | 5,425,986 A * | 6/1995 | Guyette ................. 428/141 |
| 4,895,598 A | 1/1990 | Hedberg et al. ............ 106/694 | | 5,428,931 A | 7/1995 | Ragsdale |
| 4,906,408 A | 3/1990 | Bouniol | | 5,437,934 A | 8/1995 | Witt et al. ................. 428/537.1 |
| 4,914,885 A | 4/1990 | Baker et al. ................. 52/520 | | 5,443,603 A | 8/1995 | Kirkendall |
| 4,924,644 A | 5/1990 | Lewis | | 5,461,839 A | 10/1995 | Beck |
| 4,927,696 A | 5/1990 | Berg | | 5,465,547 A | 11/1995 | Jakel |
| 4,930,287 A | 6/1990 | Volk et al. | | 5,475,961 A | 12/1995 | Menchetti |
| 4,937,993 A | 7/1990 | Hitchins | | 5,477,617 A | 12/1995 | Guy |
| 4,952,631 A | 8/1990 | McAlpin et al. | | 5,482,550 A | 1/1996 | Strait |
| 4,955,169 A | 9/1990 | Shisko | | 5,501,050 A | 3/1996 | Ruel |
| 4,963,430 A | 10/1990 | Kish et al. .................. 428/220 | | 5,511,316 A | 4/1996 | Fischer et al. |
| 4,969,250 A | 11/1990 | Hickman et al. ............. 29/521 | | 5,517,795 A | 5/1996 | Doke ..................... 52/36.4 |
| 4,969,302 A | 11/1990 | Coggan et al. | | 5,522,926 A | 6/1996 | Richard et al. |
| 4,975,396 A | 12/1990 | Thiery | | 5,522,986 A | 6/1996 | Shi et al. |
| 4,985,119 A | 1/1991 | Vinson et al. | | 5,526,627 A | 6/1996 | Beck |
| 4,995,605 A | 2/1991 | Conville | | 5,531,824 A | 7/1996 | Burkes et al. |
| 4,999,056 A | 3/1991 | Rasmussen | | 5,545,297 A | 8/1996 | Andersen et al. |
| 5,017,232 A | 5/1991 | Miceli | | 5,557,903 A | 9/1996 | Haddock ................. 52/508 |
| 5,022,207 A | 6/1991 | Hartnett | | 5,561,173 A | 10/1996 | Dry ...................... 523/218 |
| 5,045,378 A | 9/1991 | Libby | | 5,564,233 A | 10/1996 | Norton ...................... 52/60 |
| 5,047,086 A | 9/1991 | Hayakawa et al. | | 5,564,245 A | 10/1996 | Rademacher |
| 5,067,675 A | 11/1991 | Brant et al. ................. 248/48.2 | | 5,565,026 A | 10/1996 | Hense et al. |
| D322,678 S | 12/1991 | Brathwaite ............... D25/136 | | 5,580,378 A | 12/1996 | Shulman |
| 5,076,986 A | 12/1991 | Delvaux et al. | | 5,580,409 A | 12/1996 | Andersen et al. |
| 5,077,952 A | 1/1992 | Moure | | 5,598,671 A | 2/1997 | Ting ..................... 52/235 |
| 5,080,022 A | 1/1992 | Carlson | | 5,603,758 A | 2/1997 | Schreifels, Jr. et al. |
| 5,106,557 A | 4/1992 | Rirsch et al. | | 5,617,690 A | 4/1997 | Gibbs |
| 5,108,679 A | 4/1992 | Rirsch et al. | | 5,622,556 A | 4/1997 | Shulman ................ 106/677 |
| 5,112,405 A | 5/1992 | Sanchez | | 5,631,097 A | 5/1997 | Andersen et al. |
| 5,114,617 A | 5/1992 | Smetana et al. | | 5,634,314 A | 6/1997 | Champagne |
| 5,115,621 A | 5/1992 | Kobayashi | | 5,648,144 A | 7/1997 | Maurer et al. |
| 5,117,600 A | 6/1992 | Yerushalmi et al. ............ 52/262 | | 5,651,227 A | 7/1997 | Anderson |
| 5,143,780 A | 9/1992 | Balassa | | 5,661,939 A | 9/1997 | Coulis et al. |
| 5,155,958 A | 10/1992 | Huff ..................... 52/235 | | 5,673,489 A | 10/1997 | Robell |

| | | | | | | |
|---|---|---|---|---|---|---|
| 5,673,529 A | 10/1997 | Treister et al. | | 6,295,777 B1 | 10/2001 | Hunter |
| 5,675,955 A | 10/1997 | Champagne | | 6,298,626 B2 | 10/2001 | Rudden |
| 5,692,345 A | 12/1997 | Mogaki et al. ............. 52/483.1 | | 6,308,486 B1 | 10/2001 | Medland et al. .......... 52/506.05 |
| 5,694,727 A | 12/1997 | Dobija | | 6,315,489 B1 | 11/2001 | Watanabe |
| 5,697,189 A | 12/1997 | Miller et al. | | 6,316,087 B1 | 11/2001 | Lehan |
| D388,884 S | 1/1998 | Karnoski ................... D25/102 | | 6,319,456 B1 | 11/2001 | Gilbert et al. |
| 5,714,002 A | 2/1998 | Styron | | 6,324,807 B1 | 12/2001 | Ishiko |
| 5,718,758 A | 2/1998 | Breslauer | | 6,346,146 B1 | 2/2002 | Duselis et al. |
| 5,718,759 A | 2/1998 | Stav et al. | | 6,357,193 B1 | 3/2002 | Morris ....................... 52/553 |
| 5,724,783 A | 3/1998 | Mandish ................. 52/745.05 | | 6,365,081 B1 | 4/2002 | Beck |
| 5,725,652 A | 3/1998 | Shulman | | 6,367,208 B1 | 4/2002 | Campbell et al. ........ 52/169.13 |
| 5,729,946 A | 3/1998 | Beck | | 6,367,220 B1 | 4/2002 | Krause et al. |
| 5,732,520 A | 3/1998 | Maietta ..................... 52/483.1 | | 6,415,574 B2 | 7/2002 | Beck |
| 5,735,092 A | 4/1998 | Clayton et al. | | 6,421,973 B1 | 7/2002 | Gregg et al. |
| 5,736,594 A | 4/1998 | Boles et al. ..................... 524/2 | | 6,423,167 B1 | 7/2002 | Palmer et al. ............... 156/209 |
| 5,741,844 A | 4/1998 | Nass et al. | | 6,425,218 B1 | 7/2002 | Doyon et al. |
| 5,743,056 A | 4/1998 | Balla-Goddard et al. | | 6,430,885 B1 | 8/2002 | Ito et al. ..................... 52/483.1 |
| 5,749,187 A | 5/1998 | Umehara et al. | | 6,488,792 B2 | 12/2002 | Mathieu |
| 5,768,841 A | 6/1998 | Swartz et al. | | 6,510,667 B1 | 1/2003 | Cottier et al. ............ 52/742.14 |
| 5,791,109 A | 8/1998 | Lehnert et al. | | 6,514,624 B2 | 2/2003 | Takemoto ................... 428/447 |
| 5,802,790 A | 9/1998 | Lamont et al. ............. 52/288.1 | | 6,516,580 B1 | 2/2003 | Maietta ..................... 52/483.1 |
| 5,817,262 A | 10/1998 | Englert | | 6,526,717 B2 | 3/2003 | Waggpner et al. |
| 5,842,280 A | 12/1998 | Robell | | 6,539,643 B1 | 4/2003 | Gleeson |
| 5,848,508 A | 12/1998 | Albrecht | | 6,550,203 B1 | 4/2003 | Little |
| 5,848,509 A | 12/1998 | Knapp et al. | | 6,550,210 B1 | 4/2003 | Levine et al. |
| 5,857,303 A | 1/1999 | Beck et al. | | 6,551,694 B1 | 4/2003 | Imamichi et al. ............ 428/195 |
| 5,878,543 A | 3/1999 | Mowery | | 6,562,444 B1 | 5/2003 | Gleeson et al. |
| 5,887,403 A | 3/1999 | Beck | | 6,572,697 B2 | 6/2003 | Gleeson et al. ............. 106/705 |
| 5,891,374 A | 4/1999 | Shah et al. | | 6,610,358 B1 * | 8/2003 | Williams et al. ............. 427/211 |
| 5,916,095 A | 6/1999 | Tamlyn | | 6,626,947 B1 | 9/2003 | Lester et al. ............. 623/22.23 |
| 5,924,213 A | 7/1999 | Lee | | 6,676,745 B2 | 1/2004 | Merkley et al. |
| 5,928,777 A | 7/1999 | Cox et al. ................. 428/322.2 | | 6,679,011 B2 | 1/2004 | Beck et al. |
| 5,935,699 A | 8/1999 | Barber | | 6,689,451 B1 * | 2/2004 | Peng et al. ................. 428/294.7 |
| 5,945,208 A | 8/1999 | Richards et al. | | 6,699,576 B2 | 3/2004 | Peng et al. ................. 428/294.7 |
| 5,946,870 A | 9/1999 | Bifano et al. ................... 52/254 | | D489,137 S | 4/2004 | Eichner et al. ............. D25/119 |
| 5,946,876 A | 9/1999 | Grace, Sr. et al. | | D489,463 S | 5/2004 | Barnett ...................... D25/119 |
| 5,950,319 A | 9/1999 | Harris | | 6,737,008 B1 | 5/2004 | Gilbert et al. |
| 5,968,257 A | 10/1999 | Ahrens | | D492,424 S | 6/2004 | Barnett ...................... D25/119 |
| 5,979,135 A | 11/1999 | Reeves | | 6,760,978 B2 | 7/2004 | Gleeson |
| 5,987,838 A | 11/1999 | Beck | | 6,901,713 B2 | 6/2005 | Axsom |
| 6,000,185 A | 12/1999 | Beck | | 6,913,819 B2 | 7/2005 | Wallner |
| 6,012,255 A | 1/2000 | Smid et al. | | 6,941,720 B2 | 9/2005 | DeFord et al. |
| 6,018,924 A | 2/2000 | Tamlyn ..................... 52/716.8 | | 7,028,436 B2 | 4/2006 | Bezubic, Jr. ............... 52/288.1 |
| 6,026,616 A | 2/2000 | Gibson ........................... 52/95 | | 7,089,709 B2 | 8/2006 | Waggoner |
| 6,029,415 A | 2/2000 | Culpepper et al. | | 7,191,570 B1 | 3/2007 | Eaton et al. ................ 52/506.09 |
| 6,030,447 A | 2/2000 | Najie et al. | | 7,325,325 B2 | 2/2008 | Gleeson ........................ 33/563 |
| 6,046,269 A | 4/2000 | Nass et al. | | 2001/0047741 A1 | 12/2001 | Gleeson et al. ............. 106/709 |
| 6,049,987 A | 4/2000 | Robell | | 2002/0100249 A1 | 8/2002 | Peng et al. |
| 6,055,787 A | 5/2000 | Gerhaher | | 2002/0139082 A1 | 10/2002 | DeFord et al. |
| 6,063,856 A | 5/2000 | Mass | | 2003/0046891 A1 | 3/2003 | Colada et al. |
| 6,079,175 A | 6/2000 | Clear | | 2003/0054123 A1 | 3/2003 | Black et al. |
| 6,084,011 A | 7/2000 | Lucero et al. | | 2003/0056458 A1 | 3/2003 | Black et al. |
| 6,093,473 A | 7/2000 | Min ............................ 428/147 | | 2003/0089061 A1 | 5/2003 | DeFord et al. |
| 6,110,525 A | 8/2000 | Stoddard ................... 427/154 | | 2003/0172606 A1 | 9/2003 | Anderson ................... 52/302.1 |
| 6,122,876 A | 9/2000 | Bado et al. | | 2003/0200721 A1 | 10/2003 | Gleeson et al. |
| 6,122,877 A | 9/2000 | Hendrickson et al. | | 2004/0103610 A1 | 6/2004 | Axsom |
| 6,134,855 A | 10/2000 | Beck | | 2004/0163331 A1 | 8/2004 | Peng et al. |
| 6,138,430 A | 10/2000 | Van Acoleyen et al. | | 2005/0000172 A1 | 1/2005 | Anderson ...................... 52/198 |
| 6,139,620 A | 10/2000 | Suzuki et al. | | 2005/0138865 A1 | 6/2005 | Gleeson et al. ................. 52/11 |
| 6,145,255 A | 11/2000 | Allaster ............................ 52/95 | | 2005/0210790 A1 | 9/2005 | Wallner |
| 6,161,353 A | 12/2000 | Negola et al. | | 2005/0262799 A1 | 12/2005 | Gleeson et al. |
| 6,161,354 A | 12/2000 | Gilbert et al. | | 2005/0284339 A1 | 12/2005 | Brunton et al. |
| 6,164,032 A | 12/2000 | Beck | | 2006/0010800 A1 | 1/2006 | Bezubic ...................... 52/287.1 |
| 6,164,214 A | 12/2000 | Smorgon et al. | | | | |
| 6,170,212 B1 | 1/2001 | Suchyna et al. | | | FOREIGN PATENT DOCUMENTS | |
| 6,170,214 B1 | 1/2001 | Treister et al. | | | | |
| 6,170,215 B1 | 1/2001 | Nasi | | AU | 70389 | 10/1981 |
| 6,176,920 B1 | 1/2001 | Murphy et al. ............. 106/711 | | AU | 8858982 | 3/1983 |
| 6,195,952 B1 | 3/2001 | Culpepper et al. | | AU | B-84015/82 | 12/1983 |
| 6,226,947 B1 | 5/2001 | Bado et al. | | AU | 94035 S | 11/1986 |
| 6,276,107 B1 | 8/2001 | Waggoner et al. | | AU | 95878 S | 3/1987 |
| 6,277,189 B1 | 8/2001 | Chugh | | AU | 98800 S | 12/1987 |
| 6,290,769 B1 | 9/2001 | Carkner | | AU | 99683 S | 2/1988 |

| | | | | | | |
|---|---|---|---|---|---|---|
| AU | 102662 S | 1/1989 | | DE | 1952082 | 4/1971 |
| AU | 103840 S | 5/1989 | | DE | 2460879 | 6/1976 |
| AU | 104552 S | 8/1989 | | DE | 2460880 | 6/1976 |
| AU | 46878/89 | 7/1990 | | DE | 2610998 | 9/1977 |
| AU | 108078 S | 7/1990 | | DE | 3210326 | 9/1983 |
| AU | 616088 | 7/1990 | | DE | 3232106 | 3/1984 |
| AU | A-46678/89 | 7/1990 | | DE | 3505335 | 8/1986 |
| AU | 110320 S | 2/1991 | | DE | 3612010 | 1/1988 |
| AU | WO 91/11321 | 8/1991 | | DE | 3932176 | 6/1990 |
| AU | B7620191 | 6/1992 | | DE | 4004103 A1 | 10/1990 |
| AU | 117138 S | 5/1993 | | DE | 3923800 | 1/1991 |
| AU | 118448 S | 10/1993 | | DE | 4004103 A | 8/1991 |
| AU | 118862 S | 11/1993 | | DE | 4104919 | 8/1992 |
| AU | 4039893 | 11/1993 | | DE | 4209834 | 9/1993 |
| AU | 686135 | 11/1994 | | DE | 4228338 | 10/1993 |
| AU | 677649 | 12/1994 | | DE | 9403018 | 5/1994 |
| AU | 122634 S | 2/1995 | | DE | 19858342 | 12/1998 |
| AU | 123141 S | 4/1995 | | DE | 20006112 | 7/2000 |
| AU | 123142 S | 4/1995 | | DE | 19549535 | 1/2001 |
| AU | 681049 | 9/1996 | | EP | 0055504 | 7/1982 |
| AU | 702630 | 11/1996 | | EP | 0103097 | 3/1984 |
| AU | 130941 S | 8/1997 | | EP | 0173553 | 3/1986 |
| AU | 132812 S | 2/1998 | | EP | 0184477 | 6/1986 |
| AU | 732998 | 5/1998 | | EP | 0222339 | 5/1987 |
| AU | WO 98/32713 | 7/1998 | | EP | 0305209 | 3/1989 |
| AU | 135097 S | 9/1998 | | EP | 0347092 | 12/1989 |
| AU | 135557 S | 11/1998 | | EP | 0220073 | 5/1991 |
| AU | 137291 S | 5/1999 | | EP | 0428431 | 5/1991 |
| AU | 199886116 | 5/1999 | | EP | 0430667 | 6/1991 |
| AU | WO 99/22095 | 5/1999 | | EP | 0482810 A1 | 4/1992 |
| AU | 137791 S | 7/1999 | | EP | 0484283 A1 | 5/1992 |
| AU | 9952711 | 3/2000 | | EP | 0558239 | 9/1993 |
| AU | 140607 S | 5/2000 | | EP | 0564447 | 10/1993 |
| AU | WO 01/25561 A1 | 4/2001 | | EP | 0625618 | 11/1994 |
| AU | WO 01/25562 A1 | 4/2001 | | EP | 0683282 | 11/1995 |
| AU | 0078733 | 5/2001 | | EP | 0708213 | 4/1996 |
| AU | 0121275 | 6/2001 | | FR | 990242 | 5/1949 |
| AU | 783430 | 6/2001 | | FR | 2248246 | 5/1975 |
| AU | 200072012 | 6/2001 | | FR | 2405908 | 5/1979 |
| AU | 735352 | 7/2001 | | FR | 2540160 | 8/1984 |
| AU | WO 01/68547 A1 | 9/2001 | | FR | 2562591 | 10/1985 |
| AU | WO 01/73239 A1 | 10/2001 | | FR | 2624870 | 12/1987 |
| AU | 0053659 | 3/2002 | | FR | 2628775 | 9/1989 |
| AU | 147568 S | 4/2002 | | FR | 2702790 | 9/1994 |
| AU | 2001287356 | 4/2002 | | GB | 119182 | 9/1918 |
| AU | WO 02/31287 | 4/2002 | | GB | 558239 | 12/1943 |
| AU | WO 02/38518 A1 | 5/2002 | | GB | 558584 | 1/1944 |
| AU | 148485 S | 7/2002 | | GB | 564447 | 9/1944 |
| AU | 2002301511 | 6/2003 | | GB | 1086311 | 10/1967 |
| AU | 2003204739 | 7/2003 | | GB | 1125825 | 9/1968 |
| AU | 152915 S | 8/2003 | | GB | 1174902 | 12/1969 |
| AU | 153491 S | 10/2003 | | GB | 1269357 | 4/1972 |
| AU | 153493 S | 10/2003 | | GB | 1 512 084 | 5/1978 |
| AU | 153494 S | 10/2003 | | GB | 2021186 | 11/1979 |
| AU | 153495 S | 10/2003 | | GB | 2041384 | 9/1980 |
| AU | 153496 S | 10/2003 | | GB | 1577648 | 10/1980 |
| AU | 2003204418 | 12/2003 | | GB | 2064989 | 6/1981 |
| AU | 2003238481 | 12/2003 | | GB | 2067622 | 7/1981 |
| AU | WO 2004/031093 A1 | 4/2004 | | GB | 2075079 | 11/1981 |
| AU | 2003257906 | 7/2004 | | GB | 2 078 611 | 1/1982 |
| AU | WO 2004/063113 A2 | 7/2004 | | GB | 2078611 A | 1/1982 |
| AU | 2004200339 | 6/2005 | | GB | 2080851 | 2/1982 |
| CA | 730345 | 3/1966 | | GB | 2083512 | 3/1982 |
| CA | 1084230 | 8/1980 | | GB | 2148871 | 6/1985 |
| CA | 2313456 A1 | 6/1999 | | GB | 2199857 | 7/1988 |
| CH | 368918 | 4/1963 | | GB | 2252987 A | 8/1992 |
| CH | 606674 | 11/1978 | | GB | 2340071 | 2/2000 |
| CH | 678882 | 11/1991 | | JP | 49-46761 | 12/1971 |
| CH | 684285 A5 | 8/1994 | | JP | 49-116445 | 2/1973 |
| CL | 65402 | 4/2001 | | JP | 49-46761 | 12/1974 |
| CN | 1081168 A | 1/1994 | | JP | 51-23229 | 6/1976 |
| CN | 01807271.2 | 5/1998 | | JP | 52-52429 | 4/1977 |
| CN | 2281378 Y | 5/1998 | | JP | 5251719 | 4/1977 |

| | | | | | | |
|---|---|---|---|---|---|---|
| JP | 53050229 | 5/1978 | | JP | 2000-302522 | 10/2000 |
| JP | 54-123129 | 9/1979 | | JP | 2001336230 | 12/2001 |
| JP | 56 130832 | 3/1980 | | JP | 2002047750 | 2/2002 |
| JP | 55116684 | 9/1980 | | JP | 2002097732 | 4/2002 |
| JP | 56-41881 | 5/1981 | | JP | 2002161623 | 6/2002 |
| JP | 56-048413 | 5/1981 | | JP | 2002354091 | 12/2002 |
| JP | 57-156541 | 9/1982 | | JP | 2002364091 | 12/2002 |
| JP | 58045008 | 3/1983 | | JP | 2004027497 | 1/2004 |
| JP | 58059803 | 3/1983 | | KR | 19928773 | 10/1992 |
| JP | 60-105715 | 7/1985 | | KR | 1019967005677 A | 11/1996 |
| JP | 58202823 | 7/1985 | | KR | 200158855 Y1 | 5/1998 |
| JP | 60-242242 | 12/1985 | | KR | 200172372 Y1 | 2/1999 |
| JP | 61-68967 | 4/1986 | | KR | 100231910 B1 | 9/1999 |
| JP | 037444 | 1/1987 | | KR | 100274218 B1 | 9/2000 |
| JP | 63-19636 | 2/1988 | | MY | 107883 | 6/1999 |
| JP | 63 31426 | 6/1988 | | NO | 9901129 | 9/2000 |
| JP | 63257631 | 10/1988 | | NZ | 19354 | 9/1984 |
| JP | 63-47229 | 12/1988 | | NZ | 10395 | 11/1984 |
| JP | 6420910 | 1/1989 | | NZ | 210395 | 11/1984 |
| JP | 6422385 | 1/1989 | | NZ | 20119 | 10/1985 |
| JP | 6425200 | 1/1989 | | NZ | 20120 | 10/1985 |
| JP | 2507028 | 2/1989 | | NZ | 20844 | 11/1986 |
| JP | 64-50541 | 3/1989 | | NZ | 221389 | 8/1987 |
| JP | 01128748 | 5/1989 | | NZ | 211265 | 1/1989 |
| JP | 1178658 | 7/1989 | | NZ | 22705 | 7/1989 |
| JP | 02192447 | 7/1990 | | NZ | 230209 | 8/1989 |
| JP | 2204566 | 8/1990 | | NZ | 247463 | 8/1989 |
| JP | 02-236350 | 9/1990 | | NZ | 218315 | 5/1990 |
| JP | 3-4654 | 2/1991 | | NZ | 25267 | 6/1993 |
| JP | 3-63641 | 6/1991 | | NZ | 25838 | 4/1994 |
| JP | 3-66338 | 6/1991 | | NZ | 26065 | 7/1994 |
| JP | 04089340 | 3/1992 | | NZ | 26066 | 7/1994 |
| JP | 4149352 | 5/1992 | | NZ | 240533 | 7/1996 |
| JP | 09-193120 | 7/1992 | | NZ | 270310 | 12/1996 |
| JP | 04295072 | 10/1992 | | NZ | 280409 | 6/1997 |
| JP | 04300232 | 10/1992 | | NZ | 280235 | 9/1997 |
| JP | 5-1532 | 1/1993 | | NZ | 259493 | 10/1997 |
| JP | 05-044323 | 2/1993 | | NZ | 248942 | 11/1997 |
| JP | 058215 | 2/1993 | | NZ | 242960 | 12/1997 |
| JP | 565760 | 3/1993 | | NZ | 306382 | 2/1998 |
| JP | 542192 | 10/1993 | | NZ | 21875 | 4/1998 |
| JP | 06-017621 | 1/1994 | | NZ | 314544 | 6/1998 |
| JP | 6023889 | 2/1994 | | NZ | 331553 | 1/2000 |
| JP | 06-080264 | 3/1994 | | NZ | 336159 | 3/2000 |
| JP | 06123158 A | 5/1994 | | NZ | 334899 | 4/2000 |
| JP | 6-28563 | 8/1994 | | NZ | 400643 | 4/2000 |
| JP | 06278116 | 10/1994 | | NZ | 334918 | 8/2000 |
| JP | 08012450 | 1/1996 | | NZ | 335529 | 12/2000 |
| JP | 08068184 | 3/1996 | | NZ | 508055 | 12/2000 |
| JP | 08074377 | 3/1996 | | NZ | 502017 | 1/2001 |
| JP | 08-175859 | 7/1996 | | NZ | 331336 | 4/2001 |
| JP | 08217561 | 8/1996 | | NZ | 500215 | 6/2001 |
| JP | 2538120 | 3/1997 | | NZ | 507846 | 4/2002 |
| JP | 09-123340 | 5/1997 | | NZ | 502004 | 8/2002 |
| JP | 09-296560 | 11/1997 | | NZ | 505799 | 2/2003 |
| JP | 10025841 | 1/1998 | | NZ | 504881 | 3/2003 |
| JP | 10046741 | 2/1998 | | NZ | 512028 | 7/2003 |
| JP | 10-121693 | 5/1998 | | NZ | 516912 | 7/2003 |
| JP | 10-245925 | 9/1998 | | NZ | 524520 | 9/2003 |
| JP | 63117939 | 12/1998 | | NZ | 518988 | 10/2003 |
| JP | 11-210203 | 8/1999 | | NZ | 517658 | 11/2003 |
| JP | 11217918 | 8/1999 | | NZ | 521491 | 6/2004 |
| JP | 11-511110 | 9/1999 | | NZ | 525507 | 9/2004 |
| JP | 11241448 | 9/1999 | | NZ | 525328 | 2/2005 |
| JP | 11247307 | 9/1999 | | NZ | 528304 | 4/2005 |
| JP | 11256683 | 9/1999 | | NZ | 530605 | 6/2005 |
| JP | 11-280172 | 10/1999 | | NZ | 532182 | 12/2005 |
| JP | 2000008581 | 1/2000 | | NZ | 536129 | 2/2006 |
| JP | 2000-043196 | 2/2000 | | NZ | 520286 | 7/2006 |
| JP | 2000064554 | 2/2000 | | PL | 339671 | 1/2001 |
| JP | 2000-110272 | 4/2000 | | SG | 93908341 | 4/1987 |
| JP | 2000154612 | 6/2000 | | SG | 92906122 | 8/1989 |
| JP | 2000179104 | 6/2000 | | SG | 97920847 | 11/1990 |

| | | |
|---|---|---|
| SG | 97912869 | 4/1993 |
| SG | 95012084 | 1/1994 |
| SG | 96026257 | 4/1994 |
| SG | 96120035 | 4/1995 |
| SG | 97059547 | 5/1996 |
| SG | 98021017 | 9/1996 |
| SG | 98021751 | 9/1996 |
| SG | 98051485 | 2/1997 |
| SG | 97018402 | 5/1997 |
| SG | 98012917 | 6/1997 |
| SG | 99017030 | 10/1997 |
| SU | 587123 | 1/1978 |
| SU | 607813 | 4/1978 |
| SU | 655678 | 4/1979 |
| SU | 1114646 | 9/1984 |
| SU | 1606633 | 11/1990 |
| TW | 278537 | 6/1996 |
| TW | 282800 | 12/2005 |
| TW | 255851 | 6/2006 |
| TW | 278536 | 4/2007 |
| WO | 8102758 | 10/1981 |
| WO | 8503966 | 9/1985 |
| WO | 9008240 | 7/1990 |
| WO | 9111321 | 8/1991 |
| WO | 9114057 | 9/1991 |
| WO | WO 92/17657 | 10/1992 |
| WO | 9306316 | 4/1993 |
| WO | 9312303 | 6/1993 |
| WO | WO 93/21126 | 10/1993 |
| WO | 9324711 | 12/1993 |
| WO | 9419561 | 9/1994 |
| WO | WO 95/26450 | 10/1995 |
| WO | 9614482 | 5/1996 |
| WO | WO 97/07968 | 3/1997 |
| WO | WO 97/08111 | 3/1997 |
| WO | WO 97/08401 | 3/1997 |
| WO | WO 97/23696 | 7/1997 |
| WO | 9728342 | 8/1997 |
| WO | WO 98/10151 | 3/1998 |
| WO | 9832713 | 7/1998 |
| WO | WO 98/45222 | 10/1998 |
| WO | 9910607 | 3/1999 |
| WO | WO 99/13185 | 3/1999 |
| WO | 9922095 | 5/1999 |
| WO | WO 99/31158 | 6/1999 |
| WO | 9943904 | 9/1999 |
| WO | WO 99/43904 | 9/1999 |
| WO | 99064692 | 12/1999 |
| WO | WO 00/08271 | 2/2000 |
| WO | 0014354 | 3/2000 |
| WO | WO 00/21901 | 4/2000 |
| WO | WO 00/55446 | 9/2000 |
| WO | WO 00/63506 | 10/2000 |
| WO | 0065166 | 11/2000 |
| WO | WO 01/16048 | 3/2001 |
| WO | 0125561 | 4/2001 |
| WO | 0125562 | 4/2001 |
| WO | WO 01/26894 A1 | 4/2001 |
| WO | WO 01/36191 | 5/2001 |
| WO | 0149952 | 7/2001 |
| WO | 200159228 | 8/2001 |
| WO | 0166485 | 9/2001 |
| WO | 0168547 | 9/2001 |
| WO | WO 01/65021 | 9/2001 |
| WO | 0173239 | 10/2001 |
| WO | 0227109 | 4/2002 |
| WO | 0231287 | 4/2002 |
| WO | WO 02/28795 | 4/2002 |
| WO | WO 02/28796 | 4/2002 |
| WO | WO 02/32830 | 4/2002 |
| WO | 0238518 | 5/2002 |
| WO | WO 02/055806 A1 | 7/2002 |
| WO | WO 02/081839 A1 | 10/2002 |
| WO | WO 02/081840 A1 | 10/2002 |
| WO | WO 02/081841 | 10/2002 |
| WO | WO 02/081842 | 10/2002 |
| WO | 2002096824 | 12/2002 |
| WO | 2004031093 | 4/2004 |
| WO | 2004063113 | 7/2004 |
| WO | 2005003478 | 1/2005 |
| WO | 2005019550 | 3/2005 |
| WO | 2005035900 | 4/2005 |
| WO | 2005068741 | 7/2005 |
| WO | 2005078210 | 8/2005 |
| WO | 2006039762 | 4/2006 |

OTHER PUBLICATIONS

Examination Report for European Patent Application No. 00980518.5.
Notification of First Office Action issued on Sep. 24, 2004 to a related foreign application.
J.E. Mark, Applied Polymer Science 21$^{st}$ Century, pp. 209-222 (Clara D. Craver and Charles E. Carraher, Jr. ed., Elsevier 2000).
Letter from Sargent & Krahn dated Jan. 31, 2005 reporting First Substantive Report for Chilean Patent Application No. 655-2002 dated Mar. 4, 2002, which claims priority to U.S. Appl. No. 60/281,195, filed Apr. 3, 2001.
Letter from Sargent & Krahn dated Apr. 1, 2005 reporting First Substantive Report for Chilean Patent Application No. 653-2002 dated Mar. 4, 2002, which claims priority to U.S. Appl. No. 60/281,195, filed Apr. 3, 2001.
James Hardie article, "External Wall Cladding," Oct. 1990 (2 pgs).
James Hardie article, "Primeline Weatherboards," Oct. 1996 (8 pgs).
Hardihome Lap Siding with the Embossed EZ Line Alignment Aid, Mar. 2000 (4 pgs).
Kuroki et al., "Cement-Bonded Board Industry and Market in Japan and New Technology Developments," 1995 (10 pgs).
BGC Fibre Cement "Ceramic Tile Floor Underlay" Apr. 2002, 7 pgs.
Gypsum Association Manual (14$^{th}$ Edition 1994, p. 33 (3 pgs).
Database WPI, Section Ch, Week 197723, Derwent Publications Ltd., London, GB, XP002159268.
Database WPI, Section Ch, Week 197723, Derwent Publications Ltd., London, GB, XP002159269.
PCA (Portland Cement Assoc) article: "Concrete Homes - Fiber Cement Siding" (3 pgs) dated Sep. 13, 2005.
Notification of First Office Action issued on Feb. 4, 2005 to a related Chinese application, Appln No. 02811074.9.
Notification of First Office Action issued on Mar. 18, 2005 to a related Chinese application, Appln No. 02811168.0.
Notification of First Office Action issued on Mar. 18, 2005 to a related Chinese application, Appln No. 02811237.7.
Chilean patent application 170-97 (S. Ind. Pizarreno, Dec. 5, 1997).
Chilean patent application 2673-97 (S. Ind. Pizarreno, Jan. 30, 1997).
Letter from Sargent & Krahn dated Apr. 11, 2005 reporting First Substantive Report for Chilean Patent Application No. 656-2002 dated Mar. 4, 2002.
International Search Report in PCT/US02/10760 dated Aug. 5, 2002.
International Search Report in PCT/US02/10610 dated Aug. 5, 2002.
International Search Report in PCT/US02/10608 dated Aug. 5, 2002.
International Search Report in PCT/US02/10609 dated Aug. 7, 2002.
International Search Report in PCT/US2004/019980 dated Jun. 21, 2004.
Notice of Opposition of Chilean patent application No. 653-2002.
Notice of Opposition of Chilean patent application No. 655-2002.
Notice of Opposition of Chilean patent application No. 656-2002.
Notice of Opposition of Chilean patent application No. 654-2002.
Ambriose et al., "Metakaoline Blended Cements: An Efficient Way to Improve GRC Durability and Ductility", Int. Congress GRC/87, 6$^{th}$ Biennal Congress of the GRCA, Oct. 20-23, 1987.
De Silva P.S. et al., "Hydration of Cements based on Metakaolin: Thermochemistry", Adv. In Cem. Res. vol. 3, No. 12, Oct. 1990, pp. 167-177.
International Preliminary Examination Report for Application PCT/US00/31729 dated Feb. 21, 2002.

International Search Report for Application PCT/US00/31729 dated Feb. 21, 2001.
International Preliminary Examination Report for Application PCT/US01/01908 dated Apr. 6, 2002.
International Search Report for Application PCT/US01/01908 dated Mar. 19, 2001.
International Preliminary Examination Report for Application PCT/US02/10760 dated Feb. 3, 2003.
International Preliminary Examination Report for Application PCT/US02/10610 dated Feb. 7, 2003.
International Preliminary Examination Report for Application PCT/US02/10608 dated Feb. 14, 2003.
International Preliminary Examination Report for Application PCT/US02/10609 dated Apr. 22, 2003.
International Search Report for Application PCT/US02/10609 dated Aug. 1, 2002.
International Preliminary Examination Report for Application PCT/US04/19980 dated Jul. 27, 2005.
International Search Report for PCT/US00/27451 dated Feb. 2, 2001.
International Search Report for PCT/US00/27451 dated Dec. 7, 2001.
Ray et al."Use of DTA to determine the effect of Mineralizers on the Cement-Quartz Hydrothermal Reactions", Thermochimica Acta 250 (1995), pp. 189-195.
Written Opinion of the International Searching Authority, for PCT/US2004/019980 dated Dec. 20, 2005.
Zdenek Sauman et al., "Influence Explanation of Siliceous Materials Additive to Cement as well as of Pastes Hydration and Their Treatment Temperature On The Lime Quantity Liberated By Rehydration", Il Cemento, vol. 3, 1978, pp. 343-350.
Kuder, et al. "Extruded Fiber-Reinforced Composites for Building Enclosures" NSF Housing Research Agenda Workshop: Proceedings and Recommendations, Orlando, FL; Feb. 12-14, 2004, pp. 222-231.
CSR RendaLine - External Wall Cladding System - Brochure, Jan. 2002.
EPS Plaster Cladding Systems Technical and Installation Manual, Rockcote Architectural Coatings (NZ) Limited, Mar. 2003.
Stoanz Trade literature, Nov. 2003.
Stoanz Trade literature, Jan. to May 2004.
PBS Distributors Ltd trade literature relating to Vent-Clad cladding system, Aug. 2003.
Plaster Systems, Ltd., "Insulclad cavity based exterior plaster cladding system specification," Feb. 2004.

Plaster Systems, Ltd., "Insulclad cavity based exterior plaster cladding system specification," Oct. 2003.
Department of Building and Housing, "Compliance Document for NZ Bldg Code Clause E2," 2005.
New Zealand Department of Building and Housing, "Non-flush finished joints," Jul. 1, 2005, Acceptable Solution E2/AS1 (extract from the New Zealand Building Code) (1 pg).
International Search Report for PCT/AU00/00320 dated May 31, 2000.
International Search Report for PCT/AU97/00692 dated Dec. 3, 1997.
Translation of Taiwanese Patent Office Decision of Appeal and Opposition (App.#85114421).
Supplemental European Search Report (EP 97943673) dated Mar. 27, 2001.
International Search Report for AU 2004903567, filed Jun. 29, 2004.
International Search Report for PCT/IB2005/050709 dated May 23, 2005.
International Preliminary Report for PCT/IB2005/050709 dated Dec. 22, 2005.
Office Action mailed Jul. 13, 2007 in U.S. Appl. No. 10/117,401.
Office Action mailed Dec. 12, 2006 in U.S. Appl. No. 10/117,401.
Office Action mailed Mar. 27, 2006 in U.S. Appl. No. 10/117,401.
Office Action mailed Oct. 5, 2005 in U.S. Appl. No. 10/117,401.
Office Action mailed Mar. 14, 2005 in U.S. Appl. No. 10/117,401.
Office Action mailed Aug. 25, 2004 in U.S. Appl. No. 10/117,401.
Office Action mailed Nov. 3, 2003 in U.S. Appl. No. 11/117,401.
EPO Examination report in copending Application No. 02-719-435.6.
Decision to grant a patent and an Examination Report for copending Japanese Patent Application No. 2002-579593.
Examiner's First Report for copending Australian Patent Application No. 2002250516 dated Dec. 14, 2006.
Examination reports in copending Chilean Application No. 656-02 dated 2005 and 2006.
Notice of Registration and two Office Actions in copending China Application No. 02811237.7.
Decision to Grant for Patent and Preliminary Notice of Objection in copending Korean Application No. 10-2003-7013036.
Letters Patent for copending New Zealand Patent No. 528779.
Certificate of Grant of Patent in copending Singapore Patent Application No. 200305728-8.

* cited by examiner

FIG. 1

PRE-FINISHED AND DURABLE BUILDING MATERIAL

REFERENCE TO PRIOR APPLICATIONS

This application is a continuation of application Ser. No. 09/716,681, filed Nov. 20, 2000 now U.S. Pat. No. 6,689,451 and is related to and claims the benefit of U.S. Provisional Application No. 60/166,513, filed Nov. 19, 1999, which is hereby incorporated by reference in its entirety.

BACKGROUND OF THE INVENTION

1. Field of the Invention

This invention relates to building materials, and more particularly, to a building material comprising a fiber cement substrate, a polymer film and a plurality of resin impregnated sheets that is both pre-finished and durable.

2. Description of the Related Art

Fiber cement in recent years has become popular for use as a building material instead of more conventional materials such as wood, metal and plastics. Fiber cement has better water resistance than wood and is more resistant to rotting, cracking or splitting than wood. Also, fiber cement does not rust like metal, and is more durable to weathering than plastics. For instance, fiber cement products such as James Hardie Building Products' HARDIPLANK® install just as easily as wood siding, but offer a lifetime of low maintenance. Fiber cement siding is a durable, attractive alternative to traditional wood composite, cedar, vinyl, brick or stucco sidings.

Despite these advantages, fiber cement may not always have the desired exterior look and feel for a particular application. Moreover, conventional fiber cement materials are often painted or subject to other types of post-production or on-site finishing to give the material its desired appearance and exterior protection. However, exposure of paint to natural weathering and other factors can lead to chalking of the surface and loss of polymer in the paint film. Paint surfaces are also very thin, generally on the order of one to two mils, and because of that are subject to chipping, peeling and scratching from surface abuse.

Laminates comprised of a core having a sheet laminate comprised of a plurality of resin impregnated paper sheets adhered to the core are known in the art. Known core materials include engineered wood panels such as MDF (medium density fiber board) and particle boards. These products may perform satisfactorily in dry areas, but in areas subject to moisture these products have a tendency to swell, which misaligns the edges of the structure.

U.S. Pat. No. 5,425,986 discloses a laminate structure comprising a core of fiber cementboard laminated to resin impregnated sheets. The differential dimensional movement of the core and the laminate through various environmental conditions can lead to induced stresses between the fiber cement and resin impregnated sheets which often leads to splitting of the core or delamination. This is exaggerated by environments which experience high moisture followed by periods of dryness or heat and low humidity.

Accordingly, what is needed is a building material incorporating the durability and moisture resistance of fiber cement while also having a desired exterior look and feel. In addition, what is needed is a building material having an exterior surface that is pre-finished and durable to scratch and wear, while also maintaining strong adhesion to the fiber cement, and does not split, crack or delaminate when exposed to severe environmental conditions or wet/dry cycling.

SUMMARY OF THE INVENTION

One embodiment of the present invention relates to a building material comprising a fiber cement substrate having a first side and a second side, at least one resin impregnated paper over at least one of the first and second sides, and a stress-relieving polymeric film between the fiber cement substrate and the at least one resin impregnated paper, the polymer film acting as a stress relaxer between the fiber cement substrate and the at least one resin impregnated paper.

In another embodiment, a film for joining fiber cement to a resin penetrated paper is provided. This film comprises a polymer adapted to balance stresses between the fiber cement and the resin penetrated paper.

In another embodiment, a method is provided for bonding a fiber cement substrate having a surface to at least one resin impregnated paper to form a building material. The method comprises coating at least a portion of the surface of the fiber cement substrate with a stress-relieving polymer film, the polymer film being capable of preventing delamination between the substrate and the at least one resin impregnated paper. The at least one resin impregnated paper is pressed against the polymer film and the substrate.

DETAILED DESCRIPTION OF THE PREFERRED EMBODIMENTS

The preferred embodiments of the present invention relate to a pre-finished, moisture resistant and durable building material, preferably comprising laminating fiber cement to one or a plurality of resin penetrated papers or sheets such as FORMICA®. In one embodiment, a pre-finished and durable building material is provided. In another embodiment, a polymeric coating or film is provided between resin penetrated sheets and a substrate. In another embodiment, a process for bonding the resin penetrated sheets to the substrate is provided.

The pre-finished building material preferably combines three components: (1) a substrate, (2) a polymer film or coating, and (3) resin penetrated papers. These components formed together provide a building construction material that is both pre-finished and durable. The resin penetrated papers may be provided on either one side of the substrate or both sides.

The substrate is most preferably fiber cement, but may also be wood, metal such as aluminum, concrete or other cementitious material, plastic such as polyvinyl chloride, composite material such as fiber reinforced plastics, engineered wood material such as hardboard or oriented strand board and gypsum board. In one embodiment, the fiber cement substrate is about 20% to 60% Portland cement, about 20% to 70% ground silica sand, about 0% to 12% cellulose fiber, and about 0% to 6% select additives such as mineral oxides, mineral hydroxides and water. Platelet or fibrous additives, such as, for example, wollastonite, mica, glass fiber or mineral fiber, may be added to improve the thermal stability of the fiber cement. The dry density fiber cement sheet is typically about 1.3 to 1.4 $g/cm^3$ but can be modified by pressing the material to dry densities up to 2.0 $g/cm^3$ or by addition of density modifiers such as unexpanded or expanded vermiculite, perlite, clay, shale or low bulk density (about 0.06 to 0.7 g/cm³) calcium silicate hydrates or aeration.

The polymeric film is preferably polyurethane, acrylic, acrylic-styrene, polyester, polyether, polyvinyl and their modified films. Other films that may be used include but are not limited to films formed from thermosetting polymers and thermoplastic polymers, such as epoxy, polyamide, polyimide, polysulfide, silicon based polymer, natural polymers such as starch. The film may be an individual film with or without an adhesive on its surface, or may be a film formed from water based solution, solvent based solution or 100% solid polymers. In one embodiment, the thickness of the film is from about 0.2 mil to 5 mil.

The polymeric film is preferably flexible, with a glass transition temperature $T_g$ preferably between about −90° C. and 50° C., more preferably below 0° C., with good strength. The polymeric film advantageously has good adhesion to both fiber cement and resin penetrated sheets such as FORMICA®. Alternatively, when a separate adhesive is placed on one or both sides of the polymeric film, this adhesive should have good adhesion to the fiber cement and/or resin penetrated sheet.

The cellulose paper is preferably penetrated with resin of melamine-formaldehyde and phenol-formaldehyde, and may also be treated by other polymer resins, such as polyester. The thickness of the penetrated paper in one embodiment is from about 0.05 mm to 1 mm. The amount of resin in the paper is preferably from about 10% to 70%.

The process is preferably to laminate the resin penetrated papers, the polymer film and the substrate together all at the same time (direct method). Another process that may be used laminates the resin penetrated papers first, and then laminates this sheet of laminated papers, the polymer film and the substrate together (indirect method).

The invention relates in one embodiment to laminating resin impregnated papers such as FORMICA® to a fiber cement core. Lamination may occur at different pressures, and may be accomplished by direct and indirect lamination as discussed above. The invention also relates to the product of FORMICA® or similar materials laminated to fiber cement.

One problem experienced with laminating resin impregnated papers to fiber cement without a specially selected polymeric film is that the laminate suffers from delamination. For instance, after melamine-formaldehyde (MF) and phenol-formaldehyde (PF) impregnated papers are pressed in a pressure machine, the resin will cure and the lamination will have a much larger dimensional movement than the fiber cement panel under heat and moisture. Because of the differential movement, the lamination of resin impregnated paper to fiber cement will delaminate under dry conditions, high humidity or with heating up as the forces on the material tear the lamination apart.

The preferred embodiments of the present invention overcome this problem by developing a method to treat the surface of fiber cement by using a polymer coating or film to successfully stop the delamination on FORMICA® laminated fiber cement whether the product is made from direct or indirect lamination. The polymer coating is preferably a non-rigid, stress-relieving material, and is more preferably an elastomeric material, even more preferably having the properties described above, that acts as a stress relaxer to relieve the stress between the fiber cement and the resin impregnated sheets. Laminates incorporating this coating are less susceptible to delamination and/or splitting or cracking.

Optionally, the fiber cement substrate may be pressed flat in the green state or sanded after curing to obtain a smooth surface on which a minimal number (e.g., 1 or 2) of resin impregnated papers may be bonded incorporating a coating, as described above. By machining or sanding the surface smooth prior to coating, this enables a fewer number of resin impregnated papers to be used to obtain the desired flat finish. Such product has the differential stresses between the fiber cement and the resin impregnated papers more adequately balanced to resist cracking or splitting of the core.

Figure 1:
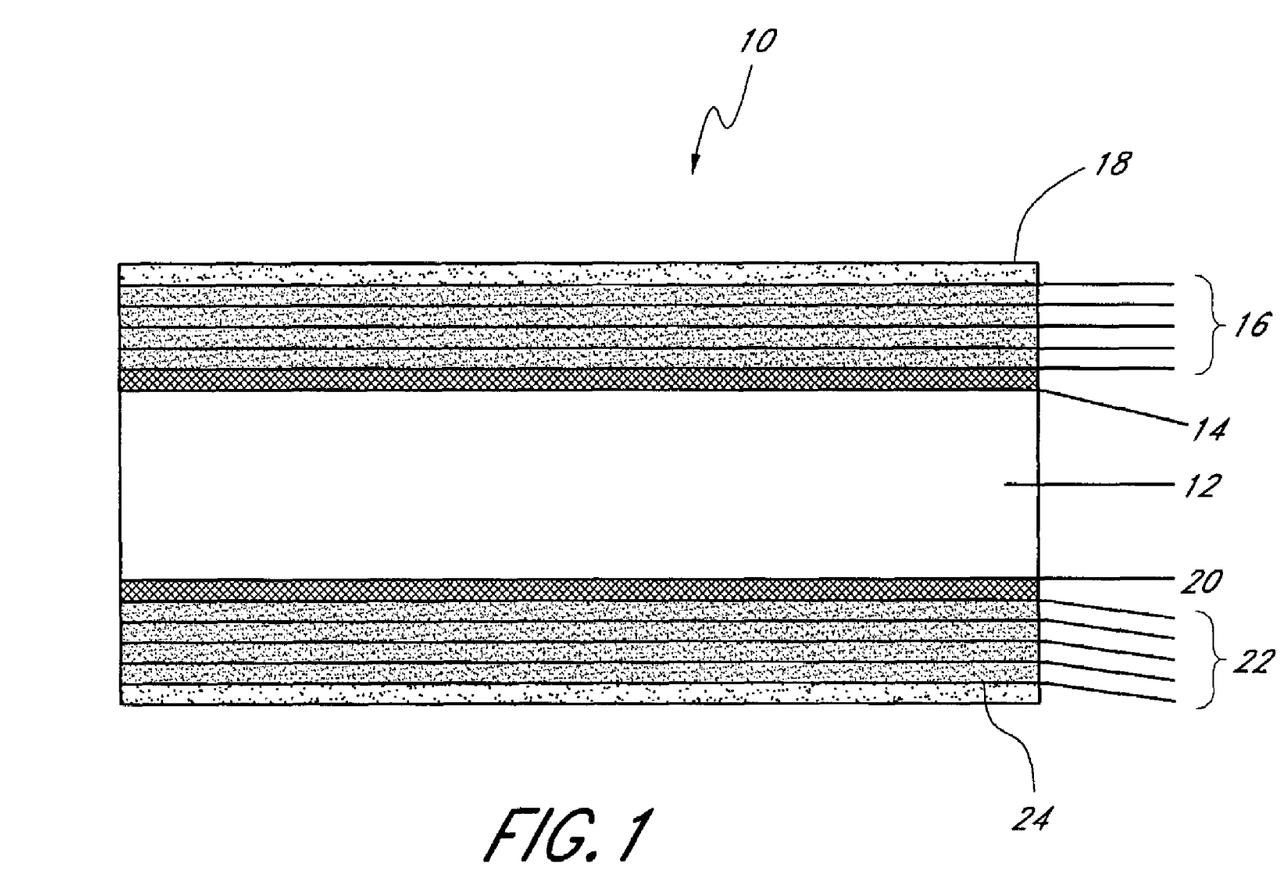
FIG. 1 is a cross-sectional view of a building material incorporating a fiber cement core having a plurality of resin impregnated papers laminated thereto according to one embodiment of the invention.

FIG. 1 illustrates one embodiment of a building material constructed in accordance with the present invention. This building material 10 includes a substrate 12, which in one embodiment is a fiber cement panel, the panel 12 having a first side and a second side. On the first side of the panel 12, a first layer of elastomeric adhesive 14 is provided, such as described above. A plurality of resin impregnated papers 16 is preferably provided over the elastomeric adhesive 14. In the embodiment shown, four layers 16 of phenol-formaldehyde impregnated papers are provided. Over the layers 16 a layer of melamine-formaldehyde penetrated paper 18 is preferably provided.

On the second side of the panel 12, a second layer of elastomeric adhesive 20 is provided. As with the first side, in one embodiment a plurality of resin impregnated papers 22, more preferably four layers of phenol-formaldehyde impregnated papers, are provided over the second layer of elastomeric adhesive 20. A layer of melamine-formaldehyde penetrated paper 24 is preferably provided over the layers 22.

The elastomeric material used for the adhesives 14, 20 preferably can be stretched and pressed without damaging the elastomeric material under limited force. The elastomeric material preferably recovers to its original shape after relieving of the force. In one embodiment, the elastomeric material used has an elongation between about 20% and 1200%, more preferably between about 100% to 1000%. The modulus of elasticity of the material at 100% elongation is preferably between about 10 to 10,000 psi, more preferably about 50 to 8,000 psi.

It will be appreciated that the embodiment shown in FIG. 1 is purely exemplifying, and thus, other types of resin impregnated papers in varying quantities may be provided. Thus, in one embodiment, resin impregnated papers may be provided only to one side of the panel 12. In addition, each side may preferably have a fewer number or larger number of phenol-formaldehyde penetrated papers, for example, 0 to 4. In the embodiment above, it will also be appreciated that additional layers of melamine-formaldehyde penetrated papers may be provided, for example 1 to 3.

Further examples of a building material 10 similar to that shown in FIG. 1 are described below.

EXAMPLE 1

One example of a building material using a direct lamination method according to this invention is herein described. A fiber cement panel having a thickness of ¼" is roller-coated with Bayhydrol PR 240 (40% of solid) on both sides of the panel. Bayhydrol 240 PR is a water-based polyurethane elastomeric adhesive available from Bayer Corp. of Pittsburgh, Pa. One layer of melamine-formaldehyde (MF) resin impregnated paper and four layers of phenol-formaldehyde (PF) impregnated papers are put on top of the coated fiber cement panel, and one layer of MF impregnated paper and one layer of PF impregnated paper is put on the bottom of the coated fiber cement. The layers and the panel together are pressed at 350° F. for 5 min at pressure of 750 psi. The laminated panel is then placed in an oven of 60° C. for 3 days.

The resulting building material showed no delamination. A building material fabricated in accordance with the embodiments described above was subjected to three types of delamination tests:
1. The building material was placed in a room temperature desiccate (humidity less than 10%) for 2 days.
2. The building material was placed in a dry oven at 60° C. for 3 days.
3. The building material was subjected to 5 dry/wet cycles, such as 24 hours in an oven at 60° C. and 24 hours soaked in water.

It has been found that when no polymer film is placed between the fiber cement and FORMICA®, delamination occurs in about 2 hours in an oven at about 60° C. With the film, no delamination occurred under the above-described three tests.

EXAMPLE 2

Another example uses an indirect lamination method for laminating decorative paper to fiber cement. The phenol-formaldehyde impregnated papers and melamine-formaldehyde impregnated papers were pressed in hot press with high pressure (for example, about 1500 psi) or with medium pressure (for example, about 1000 psi) to get paper based decorative laminates. The thickness-of the paper based laminate may vary from about 0.5 mm to 3 mm.

A fiber cement sheet having a thickness of about ¼" was coated with WC-0682-M-449 adhesive (H. B. Fuller, St. Paul, Minn.) by using a brush. WC-0682-M-449 is a water-based acrylic elastomeric adhesive. The solid percentage of the adhesive was about 48%. The amount of glue on fiber cement was about 7 g/ft$^2$ (wet based weight, i.e. 7 g of 48% adhesive) for each side. A thickness of about 0.5 mm of paper based laminate was put on both sides of the coated fiber cement. The paper based laminates and fiber cement core were pressed at about 50 psi for about 1 min. The temperatures of top platen and bottom platen in the press were about 350° F.

The laminated panel was then placed in different environment conditions for testing adhesion and delamination. The laminated panel showed excellent adhesion and had no delamination. As a comparison, instead of using an elastomeric adhesive, urea-formaldehyde adhesive, such as described in U.S. Pat. No. 5,425,986, was used to make the same laminates. Delamination occurred at the fiber cement core when the laminate was dried in oven of 60° C. for about 2 hours.

In general, the preferred embodiments of the present invention enable a building material to take advantage of the durability and other properties of fiber cement while pre-finishing the material by laminating the fiber cement to resin impregnated sheets such as FORMICA® or similar material. The pre-finished surface eliminates the need for painting, either at the building construction site or paint priming and/or paint finishing coating in the factory. FORMICA® and similar materials have the advantage over common interior and exterior house paints (such as acrylic paints) of being more durable to surface scratch and wear. Moreover, the elastomeric polymer film between the fiber cement and the FORMICA® or similar material relieves stresses therebetween and prevents delamination of the building material.

The embodiments illustrated and described above are provided merely as examples of certain preferred embodiments of the present invention. Various changes and modifications can be made from the embodiments presented herein by those skilled in the art without departure from the spirit and scope of the invention.

What is claimed is:

1. A building material, comprising:
   a cementitious substrate having a first side and a second side;
   at least one resin impregnated paper over at least one of said first and second sides;
   a stress-relieving polymeric film disposed between said cementitious substrate and said at least one resin impregnated paper, said polymeric film acting as a stress relaxer between said cementitious substrate and said at least one resin impregnated paper; and
   an adhesive disposed on at least one surface of the polymeric film, wherein the adhesive is disposed between the polymeric film and the cementitious substrate, between the polymeric film and the at least one resin impregnated paper, or combinations thereof.

2. The building material of claim 1, wherein the polymeric film is a material selected from the group consisting of polyurethane, acrylic, acrylic-styrene, polyester, polyether, polyvinyl and their modified films, epoxy, polyamide, polyimide, polysulfide, and silicon based polymer.

3. The building material of claim 1, wherein the polymeric film is an elastomer.

4. The building material of claim 1, wherein the polymeric film has a glass transition temperature between about −90 and 50° C.

5. The building material of claim 1, wherein the resin impregnated paper includes a cellulose paper penetrated with resin selected from the group consisting of melamine-formaldehyde and phenol-formaldehyde.

6. The building material of claim 1, wherein a resin impregnated paper is laminated to both said first and second sides.

7. The building material of claim 1, comprising at least one layer of phenol-formaldehyde penetrated paper over the first side of the cementitious substrate, and at least one layer of melamine-formaldehyde penetrated paper over the at least one layer of phenol-formaldehyde penetrated paper.

8. The building material of claim 1, wherein the polymeric film is an adhesive.

9. The building material of claim 1, wherein the polymeric film provides sufficient stress-relief to prevent delamination between the cementitious material and the at least one resin impregnated paper after the laminated structure is incubated at a temperature of about 60° C. for not less than three days.

10. The building material of claim 1, wherein the polymeric film provides sufficient stress-relief to prevent delamination between the cementitious material and the at least one resin impregnated paper after storing said laminated structure in a desiccated environment having a relative humidity of not more than 10% for a period of not less than two days.

11. The building material of claim 1, wherein the polymeric film provides sufficient stress-relief to prevent delamination between the cementitious material and the at least one resin impregnated paper after subjecting said laminated structure to at least five serial wet and dry cycles, wherein said dry cycle comprises incubating said laminate structure for about twenty-four hours at about 60° C., and said wet cycle comprises soaking said laminate structure in water for twenty-four hours.

12. A building material, comprising:
   a cementitious substrate having a thickness, a first side and a second side;
   at least one resin impregnated paper over at least one of said first and second sides, each resin impregnated paper having a thickness;
   a stress-relieving polymeric film disposed between said cementitious substrate and said at least one resin impregnated paper, said polymeric film acting as a stress relaxer between said cementitious substrate and said at least one resin impregnated paper; and at least one adhesive layer disposed between said cementitious substrate and said at least one resin impregnated paper, wherein the at least one adhesive layer is deposited between the cementitious substrate and the polymeric film, deposited between the polymeric film and the at least one resin impregnated paper, or combinations thereof.

13. A building material comprising, a cementitous substrate having a thickness, a first side and a second side;

at least one resin impregnated paper over at least one of said first and second sides, each resin impregnated paper having a thickness;

a stress-relieving elastomer film disposed between said cementitious substrate and said at least one resin impregnated paper, said elastomer acting as a stress relaxer between said cementitious substrate and said at least one resin impregnated paper, wherein the thickness of the elastomer film is about 5 mil or less; and at least one adhesive layer disposed between said cementitious substrate and said at least one resin impregnated paper.

14. The building material of claim 13, wherein the thickness of the elastomeric film is about 0.2 mil.

15. The building material of claim 13, wherein the at least one adhesive layer is selected from the group consisting of polyurethane, acrylic, acrylic-styrene, polyester, polyether, polyvinyl and their modified films, epoxy, polyamide, polyimide, polysulfide, and silicon based polymer.

16. The building material of claim 15, wherein the at least one adhesive layer has polymeric film properties.

17. A building material, comprising:

a cementitious substrate having a first side and a second side;

at least one resin impregnated paper over at least one of said first and second sides;

a stress-relieving polymeric film disposed between said cementitious substrate and said at least one resin impregnated paper, said polymeric film acting as a stress relaxer between said cementitious substrate and said at least one resin impregnated paper;

wherein the polymeric film has an elongation between about 20% and 1200%, wherein the polymeric film has a modulus of elasticity at 100% elongation of between about 10 and 10,000 psi, and wherein the polymeric film has a glass transition temperature between about −90 and 50° C.; and an adhesive disposed on at least one surface of the polymeric film, wherein the adhesive is disposed between the polymeric film and the cementitious substrate, between the polymeric film and the at least one resin impregnated paper, or combinations thereof.

18. A building material, comprising:

a cementitious substrate having a first side and a second side;

at least one resin impregnated paper over at least one of said first and second sides;

a stress-relieving polymeric film disposed between said cementitious substrate and said at least one resin impregnated paper, said polymeric film acting as a stress relaxer between said cementitious substrate and said at least one resin impregnated paper;

wherein the polymeric film has an elongation between about 20% and 1200%; and an adhesive disposed on at least one surface of the polymeric film, wherein the adhesive is disposed between the polymeric film and the cementitious substrate, between the polymeric film and the at least one resin impregnated paper, or combinations thereof.

19. The building material of claim 18, wherein the polymeric film has an elongation between about 100% and 1000%.

20. A building material, comprising:

a cementitious substrate having a first side and a second side;

at least one resin impregnated paper over at least one of said first and second sides;

a stress-relieving polymeric film disposed between said cementitious substrate and said at least one resin impregnated paper, said polymeric film acting as a stress relaxer between said cementitious substrate and said at least one resin impregnated paper;

wherein the polymeric film has a modulus of elasticity at 100% elongation of between about 10 and 10,000 psi; and an adhesive disposed on at least one surface of the polymeric film, wherein the adhesive is disposed between the polymeric film and the cementitious substrate, between the polymeric film and the at least one resin impregnated paper, or combinations thereof.

21. The building material of claim 20, wherein the polymeric film has a modulus of elasticity at 100% elongation of between about 50 and 8,000 psi.

22. A building material, comprising:

a cementitous substrate having a first side and a second side;

at least one resin impregnated paper over at least one of said first and second sides;

a stress-relieving polymeric film disposed between said cementitous substrate and said at least one resin impregnated paper, said polymeric film acting as a stress relaxer between said cementitous substrate and said at least one resin impregnated paper, and said polymeric film having a glass transition temperature between about −90° C. and 50° C.; and an adhesive disposed on at least one surface of the polymeric film, wherein the adhesive is disposed between the polymeric film and the cementitious substrate, between the polymeric film and the at least one resin impregnated paper, or combinations thereof.

* * * * *